May 19, 1953  E. SIMON ET AL  2,639,252
METHOD OF MAKING HOUSING FOR ELECTRICAL APPARATUS
Filed Feb. 17, 1949  4 Sheets-Sheet 1
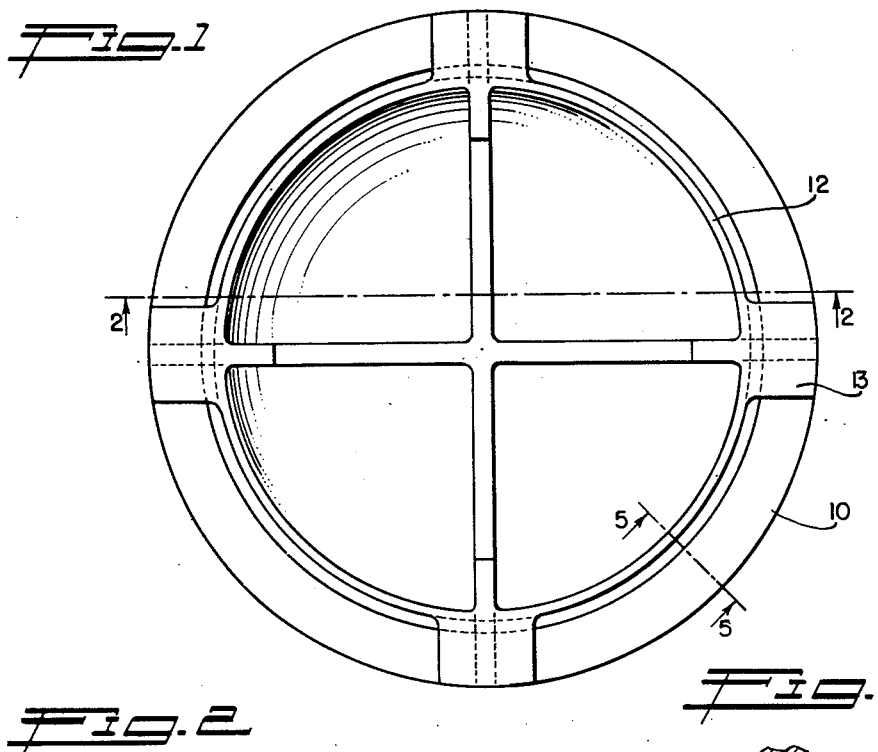
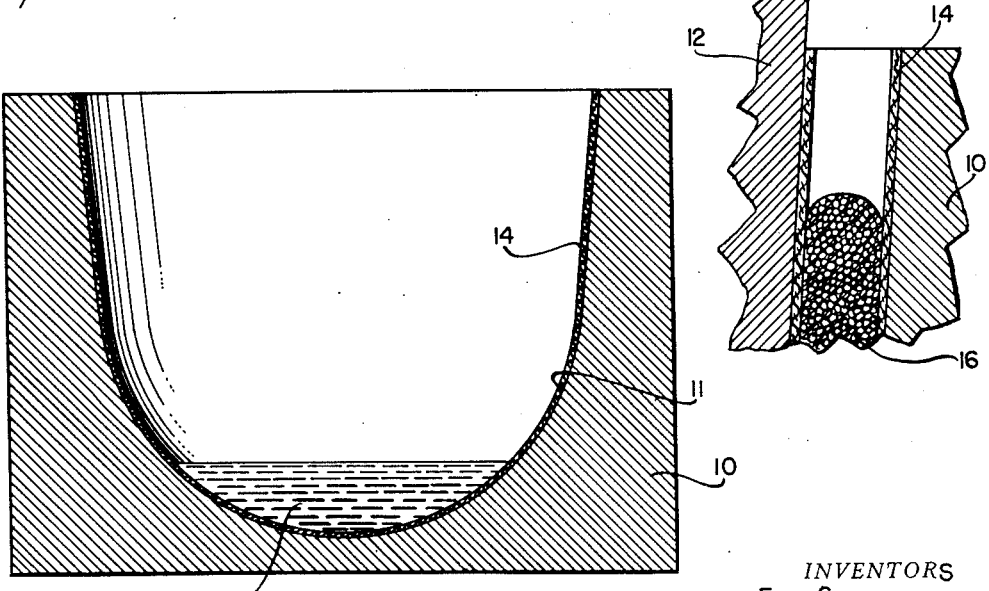
INVENTORS
ELI SIMON
FRANK W. THOMAS
EDWARD H. BURKART
BY *George C. Sullivan*
Agent

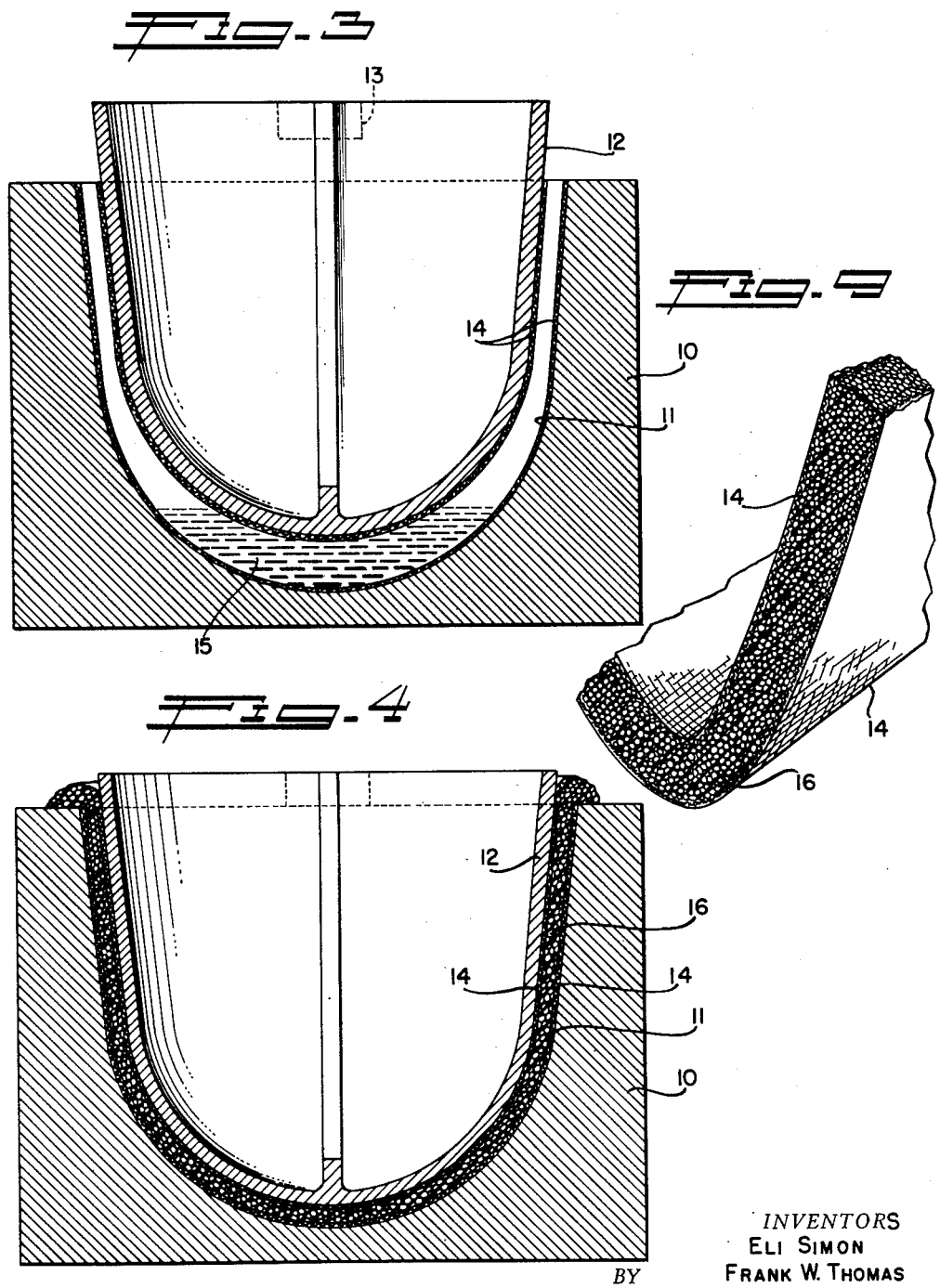

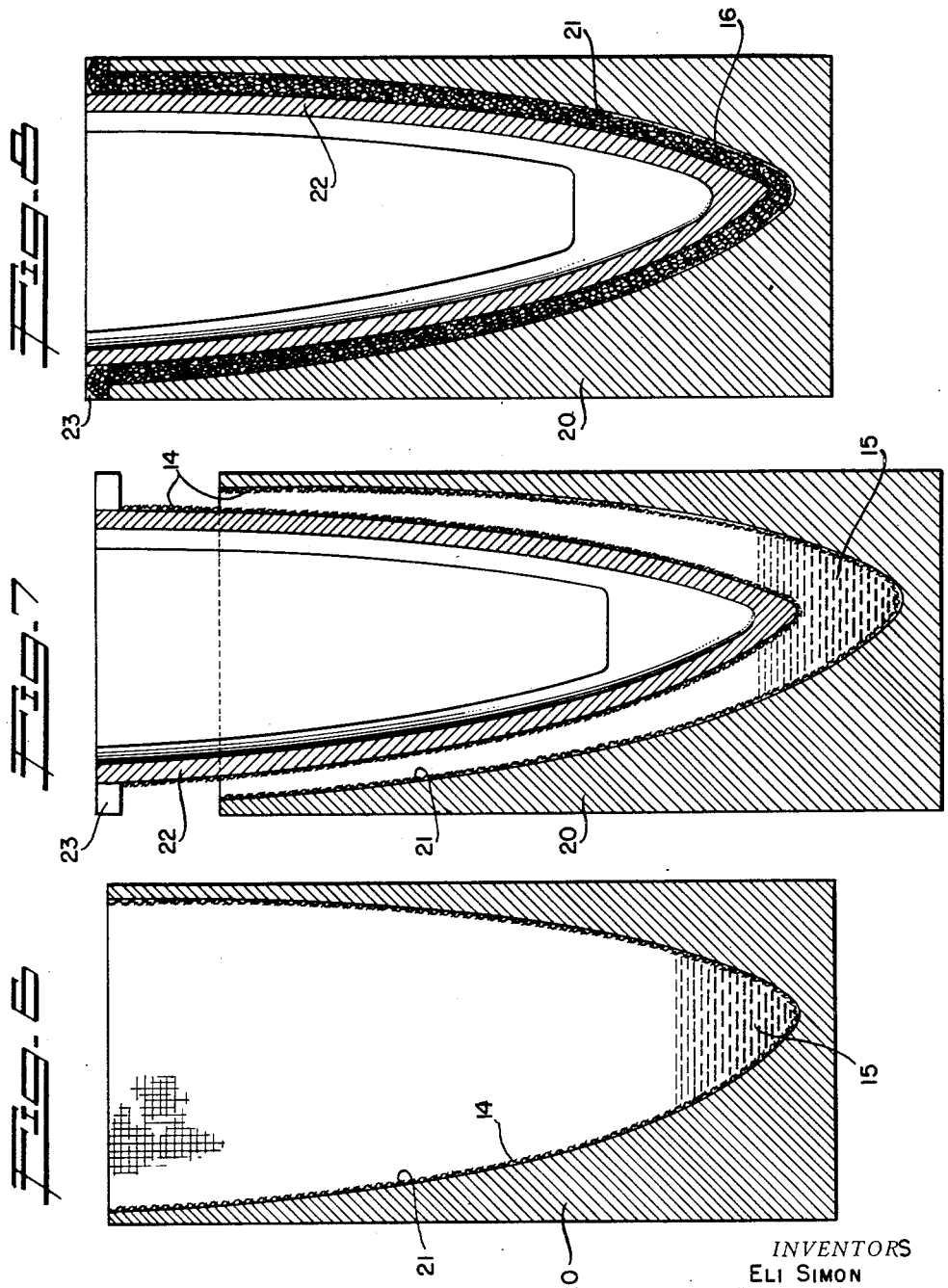

May 19, 1953  E. SIMON ET AL  2,639,252
METHOD OF MAKING HOUSING FOR ELECTRICAL APPARATUS
Filed Feb. 17, 1949  4 Sheets-Sheet 4

LAMINATE   CORE

⊕ —26— LAMINATING RESIN

◐ —27— COPOLYMER BETWEEN LAMINATING RESIN AND ISOCYANATE-CONTAINING MOLECULES

○ —25— REACTION PRODUCT OF ALKYD RESIN-DIISOCYNANATE

INVENTORS
ELI SIMON
FRANK W. THOMAS
EDWARD H. BURKART
BY
Agent

UNITED STATES PATENT OFFICE 2,639,252

METHOD OF MAKING HOUSING FOR ELECTRICAL APPARATUS

Eli Simon, Los Angeles, Frank W. Thomas, Burbank, and Edward H. Burkart, North Hollywood, Calif., assignors to Lockheed Aircraft Corporation, Burbank, Calif.

Application February 17, 1949, Serial No. 76,952

8 Claims. (Cl. 154—83)

This invention relates to improved methods for making enclosures, housings, and the like, for electrical apparatus, and like equipment.

The products, or devices, of the invention have many applications, being useful in protecting, housing and supporting numerous classes of objects and instrumentalities, particularly where there is need for dielectric properties coupled with high strength and low weight characteristics. While we do not intend to imply any restrictions on the uses or applications of the products, the invention is particularly well suited for the manufacture of "radomes" or housings for radar equipment, such housings constructed in accordance with the invention possessing excellent dielectric, strength and vibration resisting characteristics, and being highly "transparent" or conductive of micro-waves of radar transmission. In the prior methods of constructing such devices, a core of previously produced honeycomb or foamed material was cut and shaped as required and then laminated between plastic impregnated pre-formed and pre-cured laminated "skins" of fibre glass fabric or the like, employing suitable laminating resins and jigs. Such operations were time consuming and, therefore, costly, and were not productive of uniform results. Furthermore, the physical strength characteristics of the products were relatively low due to the fact that the skin material and core material were, in effect, joined at interfaces by a mechanical locking action, rather than through chemical union, of the resin employed, there being no true bonding or fusion of the skin and core materials.

It is, accordingly, an object of the present invention to provide a simple, rapid, and commercially practical method for fabricating or producing laminated objects or devices embodying one or more skins and an internal core, and to provide relatively inexpensive products or devices of this class having superior strength characteristics and micro-wave transmission characteristics.

Another object of the invention is to provide a method of the character referred to wherein the core layer or lamination is formed or produced between the skin laminations at the time the housing or object is manufactured, thereby completely eliminating the necessity for separately manufacturing the core material, cutting the same to size or shape, and fitting it to the skin material and thereby assuring uniform continuous merger or joinder of the skin and core laminae. The operation or step of producing a foamed cellular core is simultaneous with the bonding or joinder of the core and the skin laminations, thus greatly simplifying the procedure and assuring more uniform results.

Another object of the invention is to provide a method of the class referred to in which the chemical reaction accompanying the simultaneous foaming and formation of the cellular core and the joinder of the core and skins, produces pressure and exothermic heat to hold the skins against the walls of the mold and to shape the same while at the same time aiding in the polymerization and/or curing of the laminating resin. Thus the method, which preferably includes a post-curing of the product at slightly elevated temperatures, avoids the necessity of separately pre-forming and pre-curing the laminated skins, of separately making the core material, of separately tailoring the core material, and of separately bonding the "tailored" core material to the pre-formed laminated skins, and yet the method is productive of uniform products of greater physical strength.

It is another and important object of the invention to provide a method of the character described wherein the laminating resin in the skins and the reactant alkyd resin-polyisocyanate material for producing the cellular core unite chemically and copolymerize during the reaction of the core material mixture thereby producing a laminated structure or product in which the material of the laminations and the core material copolymerize in zones of joinder of some thickness to obtain the greatest strength possible. In the earlier methods of manufacturing such laminated structures and objects there has been no true chemical union between the core materials and the laminated skins and there have, therefore, been abrupt changes in the physical characteristics of the planes of joinder, thereby materially lowering the strength of the product. In the structures of the invention where the cellular core material is reacted between the laminated skins impregnated with the unpolymerized resin, the reactant mixture of the core material and the laminating resin of the skins intermingle and unite chemically in zones which may consist primarily of copolymers between the laminating resin and the resin-polyisocyanate mixture of the core, with molecules of both the resin and the mixture interspersed therein. These interfacial zones of mean or intermediate composition are coextensive with the marginal areas of the core and with at least some of the laminations of the skin, thereby strengthening the structure by including in the skin laminae some of the alkyd resin-polyisocyanate foam with its inherent high strength characteristics. Thus the method and product of the invention are differentiated from the laminated structures of the prior art where the core material and skin laminations are joined at the interfaces by mechanical locking which is primarily adhesion of the core to the skin lamination by a resin applied to or impregnated in the skin laminae and merely contacting the surfaces of the previously formed and machined core, leaving a distinct interfacial plane or connection of low strength.

A further object of the invention is to provide a method for producing "sandwich-type" housings and other objects incorporating foamed or cellular plastic cores which utilizes and requires only simple and inexpensive equipment. The only apparatus essential to the method are the male and female mold parts, platens, or the like, and an appropriate oven for the post-curing of the products.

Other objectives and features of the invention will become apparent from the following detailed description of a typical manner of performing the method in the production of two housings, or the like, throughout which description reference will be had to the accompanying drawings wherein:

Figure 1 is a plan view of the assembled mold employed in the method;

Figure 2 is a vertical sectional view taken substantially as indicated by line 2—2 on Figure 1 illustrating the female mold part with the outer skin arranged therein and containing the unreacted mixture for producing the core;

Figure 3 is a view similar to Figure 2 showing the male mold part substantially arranged in place and carrying the other laminated skin;

Figure 4 is a view similar to Figure 3 illustrating the core in the foamed or cellular condition, showing the manner in which the reactant core material holds the skin against the mold surfaces;

Figure 5 is an enlarged fragmentary sectional view taken at line 5—5 on Figure 1 showing the reacting core material rising in the mold cavity between the two skins;

Figure 6 is a vertical sectional view of another female mold part with the skin arranged therein and containing the unreacted core forming material;

Figure 7 is a view similar to Figure 6 showing the male mold part carrying the inner skin laminations and being arranged in place;

Figure 8 is a view similar to Figure 7 showing the male mold part in the final position and illustrating the core material in the foamed or cellular state where it holds the skin against the mold surfaces;

Figure 9 is an enlarged fragmentary perspective view of the housing or product made in accordance with the method as illustrated in Figures 6, 7 and 8;

Figure 10:
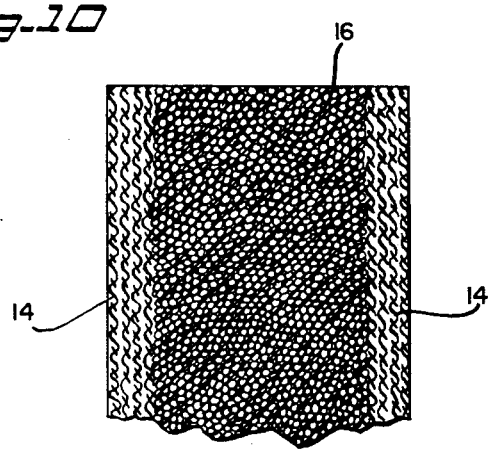
Figure 10 is an enlarged fragmentary sectional view illustrating the several laminations of one of the skins of the product.

The method provided by this invention is useful in making objects and devices varying greatly in intended use or application. For example, the devices may be simple panels, sheets, or covers, or may be housings, casings or containers of simple or complex shape for electrical devices of different kinds. As above pointed out, the devices or structures of the invention transmit radar energy, etc. with a minimum of loss and we will herein describe the method as employed to construct shells, housings, or domes for radar transmitting and/or receiving equipment, it being understood that this is only one typical application of the invention.

The method of the invention, as illustrated in Figures 1 to 5 inclusive, may be said to comprehend the general steps of providing outer laminating material or skin material 14 on the surfaces of a mold 10—12, introducing a reactant alkyd resin-polyisocyanate mixture 15 into the skin-lined mold cavity, allowing the mixture to react to form a foamed or cellular core 16 between and bonded with the skin laminations 14, and then preferably post-curing the resultant laminated structure at slightly elevated temperature.

In Figures 1 to 5 inclusive, the mold includes a female part 10 having a central cavity 11 and a male part 12 adapted to conform generally to the cavity. The upper end of the mold cavity 11 remains open to atmosphere at all times while the lower end of the cavity is closed and, in the particular case illustrated, is spherically concave, it being apparent that the cavity may have practically any required configuration. The male mold part 12 may be a recessed or hollow member to be of reduced weight and in the typical case illustrated is shaped so that its external surface is substantially parallel with and equally spaced from the wall of the cavity 11 when the mold parts are in their final positions. The part 12 is adapted to extend upwardly beyond the upper surface of the part 10 and its projecting portion has spaced radially projecting ears or lugs 13. These lugs 13 are adapted to rest on the upper end of the mold part 10 to support the part 12 and, if desired or necessary, spacers may be associated with the lugs to obtain the desired spacing between the walls of the cavity 11 and the surface of the male mold part 12. Furthermore, if desired, studs, clamps, or the like, may be used to secure the lugs 13 to the mold part 10 and thus maintain the desired relative positions of the mold parts, although such details are not essential to the method of the invention.

The initial steps of the method, as practiced in accordance with Figures 1 to 5 inclusive, are the provision of the outer or skin materials 14 and the lining of the mold surfaces with these materials. The materials 14 used for this purpose will, of course, depend to a considerable extent upon the intended use of the product being manufactured. Where the product or housing is designed for the transmission of radar or microwave energy, the skin materials or laminations 14 may be fibre glass fabric, superimposed layers of non-impregnated or non-bonded fibre glass cloth, felt, fibre glass matting, or other materials that are substantially "transparent" to radar energy. While, in most cases it is preferred to employ a plurality of superimposed layers of such material 14 on the surfaces of the cavity 11 and mold part 12, Figures 1 to 5 illustrate, for the sake of clarity only one layer or thickness of the fabric 14 of the class above named on each mold surface. Figure 10 illustrates on a much larger scale a portion of a housing having a plurality of skin material layers or laminations 14.

It is to be understood that in the following description of both manners of carrying out the method of the invention where we employ the expressions "skin fabric 14," "skin material 14," or the equivalent, we refer to multi-layer skins as shown in Figure 10 as well as the single layer skin. The skin materials 14 are arranged to completely cover the walls of the cavity 11 and the surface of the mold part 12 at least to the height or level where the housing is to be trimmed off or finished. In this manner of performing the method the skin materials 14 may either be preformed and prelaminated, that is impregnated with a laminating resin and then formed or shaped to fit their respective mold surfaces, the resin being cured so that the skin materials are substantially rigid and self-supporting, or the skin materials 14 may be unlaminated and without resin either cured or uncured in which case appropriate care is taken to arrange and support the soft unformed skin materials 14 on their respective mold surfaces. Where the skin materials 14 have a plurality of layers it is preferred to offset the edges of adjacent layers so that substantially uniform strength is obtained.

The next operation is the introduction into the lined mold cavity 11 of a suitable quantity of a reactant cellular plastic producing material or mixture 15. Figure 2 illustrates a body of the liquid reactant mixture 15 in the lower portion of the cavity 11, lined by the skin material 14. It is prefered to employ a reactant alkyd resin-meta-toluene diisocyanate mixture of the class described and claimed in the copending application of Eli Simon and Frank W. Thomas, Serial No. 77,058, filed February 17, 1949, now Patent No. 2,591,884 granted April 8, 1952. The following are typical formulae of this case of reactant cellular plastic producing compounds:

*Formula 1*

|  | Grams |
|---|---|
| An alkyd resin having an acid number of 20 and a water content of 0.85% by weight obtained from the reaction of 4 mols trimethylol propane, 2.5 mols adipic acid and 0.5 mol phthalic anhydride | 60 |
| Meta-toluene diisocyanate, containing 2 grams ethyl cellulose having 7 centipoise viscosity and having from 46.8 to 48.5 ethoxyl content per 100 grams of the meta-toluene diisocyanate | 40 |
| Diallyl phenyl phosphonate | 10 |
| Benzoyl peroxide | 0.50 |

*Formula 2*

|  | Grams |
|---|---|
| Alkyd resin of Formula 1 | 60 |
| Meta-toluene diisocyanate, containing 2 grams ethyl cellulose having 100 centipoise viscosity and having an ethoxyl content of from 46.8 to 48.5% per 100 grams of the meta-toluene diisocyanate | 40 |
| Diallyl phenyl phosphonate | 10 |
| Benzoyl peroxide | 0.5 |

*Formula 3*

|  | Grams |
|---|---|
| Alkyd resin of Formula 1 having an acid number of 20 and a water content of 0.85% by weight | 30 |
| Meta-toluene diisocyanate, containing 2 grams of ethyl cellulose having a viscosity of 100 centipoises and an ethoxyl content of from 48.0 to 49.5% per 100 grams of the meta-toluene diisocyanate | 20 |
| Zinc stearate powder | 1½ |
| Diallyl phenyl phosphonate | 5 |
| Benzoyl peroxide | 0.25 |

In Formulae 1, 2 and 3 and in similar formulations the concentration range of the ethyl cellulose additive is from 0.03 gram to 15 grams for each 100 grams of the meta-toluene diisocyanate. The ethyl cellulose employed in such formulations may have an ethoxyl content range of from 45.0 to 49.5%, and a viscosity of 7 centipoises to approximately 200 centipoises with a preferable viscosity of approximately 50 to 100 centipoises. The reactant mixtures of these and similar formulations react at atmospheric pressure to greatly increase their volumes and to produce high strength, light weight cellular plastics having very small uniform cells. The cellular plastics thus obtained have high compressive strength, high tensile strength, and good shock and vibration resistance characteristics. Furthermore, it has been found that such cellular plastics are highly "transparent" to radar energy producing a minimum of attenuation losses. In fact, it has been found that all of the alkyd resin-diisocyanate cellular plastics of the classes herein described are effective in the transmission of such energy except those incorporating metallic leafing powders. Where it is required that the latter types of foamed plastics transmit radar energy, the formulations may be readily changed by merely substituting any of the metallic soap powders hereinafter set forth for the metallic leafing powder component. The following formulae are typical of those incorporating metallic soap powders and metallic leafing powders:

*Formula 4*

|  | Grams |
|---|---|
| Alkyd resin of Formula 1 | 30 |
| Polyisocyanate reagent containing meta-toluene diisocyanate and 0.065 mol of 2 methyl, 2-4 pentanediol for each mol of meta-toluene diisocyanate | 20 |
| Zinc stearate powder | 1½ |
| Diallyl phenyl phosphonate | 5 |
| Benzoyl peroxide | ¼ |

*Formula 5*

|  | Grams |
|---|---|
| Alkyd resin of Formula 1 | 30 |
| Polyisocyanate reagent containing meta-toluene diisocyanate and from 0.01 to 0.25 mol of toluene diamine for each mol of the meta-toluene diisocyanate | 20 |
| Aluminum leafing powder | 2 |

The reactant mixtures of Formulae 4 and 5 are of the class described and claimed in the copending application of Eli Simon and Frank W. Thomas, Serial No. 71,037, filed January 14, 1949, now Patent No. 2,602,783.

Following the introduction of the reactant plastic material 15 into the lined female mold 10, the male mold part 12 carrying its skin material 14, is entered in the cavity 11 and properly positioned with respect to the mold part 10. Figure 3 of the drawings shows the mold part 12 being entered into the cavity 11. It will be observed that the reactant liquid alkyd resin-polyisocyanate mixture 15 is partially displaced upward by the mold part 12 and that the upper end of the mold cavity remains open to the atmosphere. A sufficient quantity of the reactant mixture 15 is provided in the mold to assure a full or adequate filling of the space between the lined walls of the cavity 11 and the covered or lined part 12 by the cellular plastic. In practice, the alkyd resin-polyisocyanate mixture reacts at atmospheric pressure to produce a multitude of small, generally uniform spherical gas filled cells throughout the entire core 16 and the foamed or cellular plastic mass or core 16 may rise in the mold space, as shown in Figure 5, to spill over the top of the mold assembly in the manner illustrated in Figure 4. While not essential, it is preferred to maintain the mold parts at a temperature of about 120° F. during the reaction of the core forming cellular material. The foam producing reaction of the material 15 is accompanied by the exothermic heat and pressure, the heat assisting in curing the resin and the pressure serving to urge the skins 14 firmly and evenly against the walls of the mold. Where the skin material 14 has been prelaminated and preformed, the cellular plastic 16 adheres to and bonds with the inner surfaces of the laminated material 14. The resin employed in the prelaminated skin material 14 is preferably compatible with the alkyl resin-polyisocyanate reactant mixture but the latter securely bonds with and adheres to practically all skin materials and the laminating resins employed therein and, in fact, strongly adheres to most materials. Where the skin materials 14 are prelaminated and preformed and contain polymerized cured resins or plastic, the material of the cellular plastic core 16 will not penetrate the skin materials 14 to any appreciable extent and will not engage the walls of the cavity 11 or the surface of the mold part 12. Therefore, upon completion of the reaction of the core 16 and following the initial setting and curing of the core material, the product or housing may be removed from the mold following withdrawal of the male mold part 12. The product or housing is then preferably post-cured at a temperature of from 125° F. to 225° F. for from 10 to 12 hours to continue polymerization of the reaction and thus obtain a stronger more heat stable core 16.

When the skin materials 14 are not prelaminated and not preformed but are in the nature of one or more layers of dry, porous, or soft fabric, felt or the like, the reactant alkyd resin-polyisocyanate liquid or plastic material 15 penetrates the skin materials 14 and therefore will reach the wall of the cavity 11 and the surface of the mold part 12. Accordingly, it is desirable in this case to coat or cover the surfaces of the mold with a parting material prior to arranging or positioning skin materials 14 in the mold so that the alkyd resin-polyisocyanate mixture will not adhere to the mold wall. Graphite, deposited from oil-dag, water-dag or alcohol-dag, or mineral oil, or the like, may be used as the parting material. Where the article being produced is to be used with radar equipment, it is preferred to use mineral oil, or the like, as a parting material. The penetration of the skin materials 14 by the reactant alkyd resin-polyisocyanate mixture 15 results in a particularly effective lamination or bonding of the several layers of the skins 14 and a strong uniform and continuous bonding or merger of the skins 14 with the cellular core 16. The material 15 that enters the skin 14 and that occupies the zones at the inner faces of the skins 14 reacts in the same manner as the material in the main mass of the core 16 to produce a cellular, high strength, low density plastic characterized by extremely small pores or cells of uniform size and shape. The foamed or cellular plastic coats embeds and bonds with the layers, strands, threads and fibres of the skin material 14 so that the skins are, in effect, cast or embedded in the self-same material that constitutes the core 16 with no plane or zone of contrasting or differing physical characteristics existing at the interfaces or planes of joinder of the core 16 and skins 14. This results in a product or structure of great strength, uniform composition and uniform physical characteristics and of uniform transparency to radar or micro-wave energy throughout. Upon completion of the initial reaction of the core 16 and after the skins 14 are cured so as to be self-supporting, the product or housing is removed from the mold and given a post-cure at a temperature of from 125° F. to 225° F. from 10 to 20 hours as previously described.

The housings or devices produced, as above described, each comprise a continuous one-piece core 16 of foamed or cellular plastic and internal and external skins 14 of fibre glass fabric, felt, or the like, laminated and impregnated with resin or plastic. The sandwich-type construction, or laminated construction, is exceedingly strong and yet has a very low density owing to the low density cellular plastic core 16. The products have good dielectric characteristics, and, as above pointed out, pass or conduct microwave energy, etc. with but slight loss. The products may be cut or machined as found necessary and it is usually preferred, or at least desirable, to trim off the rough or uneven upper or open ends of the housings to bring the housings to the desired size and shape.

The method of the invention, as illustrated in Figures 6 to 9 and 11, comprises, generally, substantially the same steps or operations as above described, except that the skin materials 14 are wet or saturated with a laminating resin prior to or upon being arranged on the surfaces of the mold 20—22.

The female mold part 20 has a recess 21 of the selected or required configuration and the male mold part 22 is shaped to conform to the recess and leave a mold space or cavity of the required thickness and shape. This mold cavity is at all times open at its upper end to the atmosphere and the male mold part 22 may be supported in the correct position on the part 20 by lugs 23 engaging the top surface of the part 20. In this particular mold arrangement it may be assumed that the parts 20 and 22 are elongate and that the housings or objects to be formed therein are elongate chambered or hollow members having somewhat curved side walls converging to a rather abrupt or sharp edge, although it is to be understood that the mold may be designed to produce objects of practically any shape.

The skin material 14 may be of the same nature as above described, that is, it may be one or more layers or plies of fibre glass fabric, fibre glass matting, felt, or the like, or combinations of such materials. However, in this manner or process of carrying out the invention the skin materials 14 are saturated or partially saturated with what we term a laminating resin prior to or at the time they are arranged on the surfaces of the mold 20—22 and the alkyd resin-diisocyanate reactant mixture 15 is allowed or caused to react in the mold space defined by the wet skin material 14 so that the foaming alkyd resin-diisocyanate product copolymerizes with the laminating resin to produce or provide in the product diffusion zones of cured or hardened resins. These diffusion zones, which are coextensive with the marginal portions of the core 16, as well as with some or all of the laminated or single ply skins 14, are areas whose compositions graduate or change gradually from substantially pure laminating resin to the substantially pure alkyd resin-diisocyanate reaction product of the core. One of these diffusion interfacial zones is illustrated diagrammatically, on an enlarged scale, in Figure 11, as will be more fully described below. To facilitate a fuller understanding of the copolymerizing action obtained when the material of the core 16 reacts in the mold space between the skins 14 which carry or are saturated with the laminating resin, we will describe several alkyd resin-diisocyanate reactant mixtures and several suitable laminating resins and the mechanism of the copolymerization of the same at the interfacial diffusion zones of the housing or product.

The alkyd resins which we preferably employ in the polyisocyanate reactant mixtures are the reaction products of polyhydric alcohols and polybasic acids unmodified or modified with oil and/or other resins and having an acid number of from 5 to 80, a water content of from 0.1% to approximately 3.0% by weight and having the following ratio range of the hydroxyl to the carboxyl groups in the alkyd resin reactants:

From 3 hydroxyl (OH):1 carboxyl (COOH)
To 4 hydroxyl (OH):5 carboxyl (COOH).

It is usually preferred to employ alkyd resins having an acid number of between 10 and 25 and wherein the ratio of the hydroxyl groups to the carboxyl groups is 2 to 1. The following formulae are suitable for preparing unmodified alkyd resins from polyhydric alcohols and polybasic acids, the ratios of the hydroxyl groups to the carboxyl groups in the alkyd resin reactants of these formulae being 2 to 1.

*Formula A*

|  | Mols |
|---|---|
| Glycerol | 4 |
| Adipic acid | 2.5 |
| Phthalic anhydride | 0.5 |

*Formula B*

|  | Mols |
|---|---|
| Glycerol | 2 |
| 1,4 butylene glycol | 1 |
| Adipic acid | 2 |

*Formula C*

|  | Mols |
|---|---|
| Trimethylol propane | 4 |
| Adipic acid | 2.5 |
| Phthalic anhydride | 0.5 |

In Formula A from 3 to 5 mols of glycerol, from 1.5 to 3 mols adipic acid and from 0.1 to 1.5 mols of phthalic anhydride may be used while in Formula C the practical operative range of proportions is from 3 to 5 mols trimethylol propane, from 1.5 to 3 mols adipic acid and from 0.1 to 1.5 mols phthalic anhydride. The following Formulae D and E are suitable for preparing unmodified alkyd resins from single polyhydric alcohols and single polybasic acids productive of resins suitable for use in the cellular plastic mixture.

*Formula D*

|  | Mols |
|---|---|
| Glycerol | 4 |
| Adipic acid | 3 |

*Formula E*

|  | Mols |
|---|---|
| Trimethylol propane | 3 |
| Phthalic anhydride | 2 |

The ratio of the hydroxyl groups to the carboxyl groups in the alkyd resin reactants of Formula D is 2(OH):1(COOH) and in Formula E this ratio is 9(OH):4(COOH). The following Formula F is an example of an oil modified alkyd resin suitable for employment in the reactant cellular plastic producing mixture, the ratio of the hydroxyl groups to the carboxyl groups in the alkyd resin reactant being 3(OH):3½(COOH).

*Formula F*

|  | Mols |
|---|---|
| Glycerol | 1 |
| Phthalic anhydride | 1.5 |
| Oleic acid | 0.5 |

The following Formula G is an example of a natural resin modified alkyd resin suitable for incorporation in the cellular foamed plastic core material, the ratio of the hydroxyl to the carboxyl groups being 1 to 1.

*Formula G*

| | | |
|---|---|---|
| Glycerol | gram mol | 1 |
| Sebacic acid | do | 1½ |
| Resin copal | grams | 100 |

We have found that the most satisfactory results are obtained when the water content range of the alkyd resin component of the diisocyanate alkyd resin reactant mixture is from 0.1% to 3.0% by weight without regard to the specific manner of incorporating the water in the mixture. In the typical examples herein set forth, it will be considered that the water component of the diisocyanate-alkyd resin reactant mixture is incorporated by dissolving a calculated amount of the water in the selected alkyd resin and suitably agitating the resin-water mixture so that the alkyd resin component will contain the selected proportion of water. However, as set forth in the copending application of Eli Simon and Frank W. Thomas, Serial No. 35,294, filed June 25, 1948, now Patent No. 2,577,279, the water may be incorporated in the reactant mixture in combination with a non-ionic wetting agent or by the use of one or more salt hydrates.

The isocyanate employed in the alkyd resin polyisocyanate reactant mixture is preferably meta-toluene diisocyanate. As described and claimed in the copending application of Eli Simon and Frank W. Thomas, Serial No. 50,007, filed September 18, 1948, now Patent No. 2,577,728, metallic soap powders may be incorporated in the diisocyanate alkyd resin reactant mixture to serve as foaming agent stabilizers and thus obtain superior results. The metallic soap powders that are effective for this purpose are metallic soap powders of fatty acids having from 12 to 20 carbon atoms including:

Zinc stearate
Aluminum stearate
Calcium stearate
Magnesium stearate
Magnesium hydroxy stearate
Barium stearate
Zinc laurate
Calcium oleate
Strontium stearate The proportion of the metallic soap powder employed may vary considerably. Thus, it has been found that from $\tfrac{1}{16}$ gram to 7½ grams of the selected metallic soap powder may be used for each 30 grams of the alkyd resin in the alkyd resin-meta-toluene diisocyanate reactant mixture.

The copending application of Eli Simon and Frank W. Thomas, Serial No. 77,058, filed on an even date herewith, now Patent No. 2,591,884, discloses the incorporation in the alkyd resin-meta-toluene diisocyanate-water system of high molecular weight thermoplastic film producing polymeric resin additives which serve as film stabilizers. These additives result in the production of foamed plastics having very small uniform cells and having superior physical strength. Furthermore, the additives permit the use of a higher water content in the alkyd resin-meta-toluene diisocyanate system, for example a water content of 5% by weight, thus reducing the density of the cellular plastic material. Further, it has been found to be particularly advantageous to employ the high molecular weight polymeric additives in the cellular plastic material of the cores where the product or articles of this invention are to be used in association with radar equipment.

The high molecular weight polymeric resin additives are soluble in the meta-toluene diisocyanate and may or may not react therewith. Included among these additives that are productive of a more effective small cell foamed plastic core material are:

1. Ethyl cellulose.—This polymeric resin has a molecular weight of approximately 130,000 and it is preferred to employ an ethyl cellulose having from 43% to 50% ethoxyl content. The best results have been obtained where the ethoxyl content is from 45% to 49.5% and where the viscosity is between 50 and 100 centipoises.
2. Polymeric chlorinated natural rubber.—This product has an average chlorine content of 67% and a preferred viscosity of between 125 and 1,000 centipoises.
3. Polymeric acrylate and methacrylate resins and their co-polymers (prepared by polymerizing lower esters of acrylic and methacrylic acid):
    a. Methyl methacrylate
    b. Propyl methacrylate
    c. Isobutyl methacrylate
    d. Butyl methacrylate
    e. Co-polymer of methyl acrylate and ethyl methacrylate.
4. Benzyl cellulose—formed by the reaction of benzyl chloride with alkali cellulose.
5. Polystyrene.
6. Polydichlorostyrene.
7. Natural rubber (polymeric isoprene) the molecular weight of natural rubber has been variously determined as ranging between 100,000 and 300,000.
8. Polyvinyl butyral.
9. Polymeric vinyl chloride—vinyl acetate copolymers:
    a. Containing approximately 87% vinyl chloride and 13% vinyl acetate and having a molecular weight of approximately 6,000 to approximately 25,000
    b. Containing from 90% to 95% vinyl chloride.
10. Polyvinyl acetate (produced by polymerization of vinyl acetate). The molecular weights of the polyvinyl acetate suitable for incorporation in the cellular plastic formulation range from approximately 10,000 to approximately 50,000.
11. Polyvinyl chloride (having an average molecular weight of approximately 5,000).

The concentration or proportion of the selected high molecular weight polymeric resin employed may be varied considerably. For example from 0.03 gram to 15 grams of the ethyl cellulose or from 5 to 20 grams of the chlorinated natural rubber may be used with each 100 grams of the meta-toluene diisocyanate as incorporated in the reactant cellular foamed producing mixture.

The cellular plastic core material employed in the method and product of the invention may be made flame resistant and self-extinguishing when once ignited by incorporating flame retardant additives in the alkyd resin-meta-toluene diisocyanate reactant mixture. Such additives are unsaturated alkyl esters of aryl phosphonic acids namely compounds having the general formula: $ArPO(OCH_2CR:CHR^1)_2$ where Ar represents aryl and alkaryl hydrocarbon radicals and R and $R^1$ are hydrogen and alkyl hydrocarbon radicals. Compounds of this character are described in United States Letters Patent No. 2,425,765 issued August 19, 1947, and include:

1. Diallyl phenyl phosphonate
2. Bis (methallyl) benzene phosphonate
3. Diallyl toluene phosphonate These additives, in addition to imparting flame resistance and to decreasing flame propagation characteristics of the foamed cellular product, also serve to materially decrease the density of the foamed material. In practice, from 1 gram to 20 grams of the flame resistant additive may be employed with each 30 grams of the alkyd resin. Where such fire resistant additives are employed it may be found desirable to predissolve benzoyl peroxide in the additive in the proportion of approximately 5% by weight of the additive.

The following are typical examples of the alkyd resin-meta-toluene diisocyanate reactant formulations for the core forming mixture 15:

Example I

| | Grams |
|---|---|
| Alkyd resin of Formula C having an acid number of 20 and a water content of 0.85% by weight | 60 |
| Meta-toluene diisocyanate containing 2 grams of ethyl cellulose, having a centipoise viscosity of 7 and an ethoxyl content of from 46.8 to 48.5 per 100 grams of meta-toluene diisocyanate | 40 |
| Diallyl phenyl phosphonate | 10 |
| Benzoyl peroxide | 0.5 |

Example II

| | Grams |
|---|---|
| Alkyd resin of Formula C having an acid number of 20 and a water content of 0.85% by weight | 60 |
| Meta-toluene diisocyanate containing 1 gram of ethyl cellulose, having a centipoise viscosity of 200 and an ethoxyl content of from 46.8 to 48.5 per 100 grams of the meta-toluene diisocyanate | 40 |
| Diallyl phenyl phosphonate | 10 |
| Benzoyl peroxide | 0.5 |

Example III

| | Grams |
|---|---|
| Alkyd resin of Formula C having an acid number of 20 and a water content of 0.85% by weight | 60 |
| Meta-toluene diisocyanate containing 0.03 gram ethyl cellulose of 100 centipoise viscosity and from 48.0 to 49.5% ethoxyl content per 100 grams of meta-toluene diisocyanate | 40 |
| Diallyl phenyl phosphonate | 10 |
| Benzoyl peroxide | 0.5 |

Example IV

| | Grams |
|---|---|
| Alkyd resin of Formula C having an acid number of 20 and a water content of 0.85% by weight | 60 |
| Meta-toluene diisocyanate containing 2 grams of ethyl cellulose of 100 centipoise viscosity and an ethoxyl content of 48.0 to 49.5% per 100 grams of meta-toluene diisocyanate | 40 |

Example V

| | Grams |
|---|---|
| Alkyd resin of Formula A having an acid number of 16 and a water content of 0.87% by weight | 30 |
| Meta-toluene diisocyanate | 20 |
| Zinc stearate powder | 2 |
| Diallyl phenyl phosphonate | 5 |
| Benzoyl peroxide | 0.25 |

Example VI

| | Grams |
|---|---|
| Alkyd resin of Formula C having an acid number of 20 and a water content of 0.85% by weight | 30 |
| Meta-toluene diisocyanate containing 5 grams of chlorinated natural rubber of 1,000 centipoise viscosity per 100 grams of the meta-toluene diisocyanate | 20 |
| Diallyl phenyl phosphonate | 5 |
| Benzoyl peroxide | 0.25 |

Example VII

| | Grams |
|---|---|
| Alkyd resin of Formula C having an acid number of 20 and a water content of 0.85% by weight | 30 |
| Meta-toluene diisocyanate containing 4 grams of benzyl cellulose per 100 grams of the meta-toluene diisocyanate | 20 |
| Diallyl phenyl phosphonate | 5 |
| Benzoyl peroxide | 0.25 |

Example VIII

| | Grams |
|---|---|
| Alkyd resin of Formula A having an acid number of 14 and a water content of 0.31% by weight | 30 |
| Meta-toluene diisocyanate | 20 |
| Aluminum stearate powder | 1 |

Example IX

| | Grams |
|---|---|
| Alkyd resin of Formula A having an acid number of 34 and a water content of 1.4% by weight | 30 |
| Meta-toluene diisocyanate | 22½ |
| Aluminum leafing powder | 1½ |

Furthermore, the reactant core-forming mixture 15 may be of the character employed in the previously described form of the invention and of the kind set forth in Formulae 1 to 5 inclusive. When the article being produced is required to transmit radar energy it is not desirable or practical to incorporate metallic leafing powders in the formulations.

Figure 11:
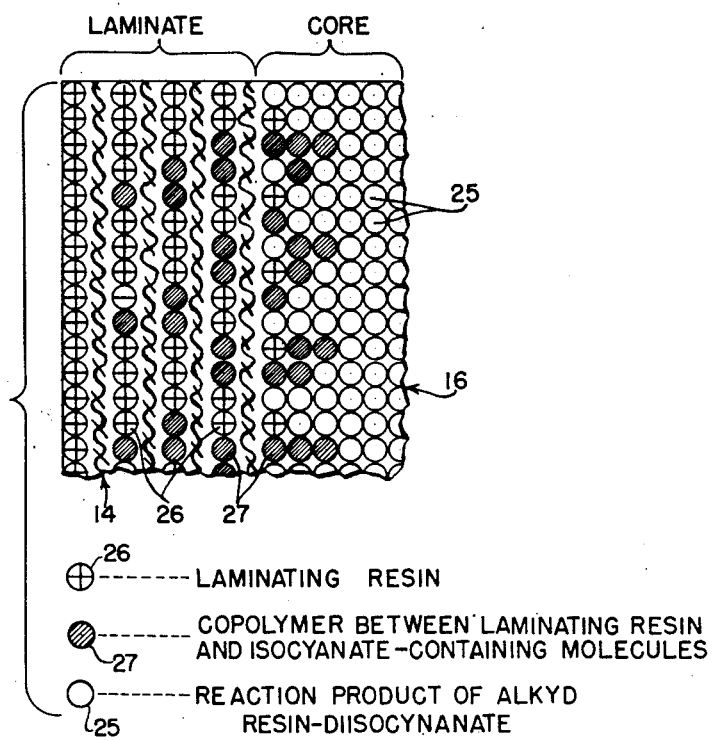
Figure 11 is a diagrammatic view on a greatly enlarged scale illustrating the skin and interfacial area of the product and showing the interspersion of the cellular core material and laminating resin.

The above mentioned laminating resins applied to or impregnated in the skin materials 14 may be thermosetting plastic resins or blends or mixtures of thermosetting resins and thermoplastic resins. The laminating resins of the skin materials 14 are capable of copolymerizing with the foaming alkyd resin-diisocyanate reaction products to result in diffusion zones of cured or hardened resins, which zones are characterized by a gradual gradation in content from substantially pure laminating resin in the outer portions or laminae of the skins 14, to intermediate areas at the interfaces of the core 16 and skins 14 containing laminating resin molecules, alkyd resin-diisocyanate reaction product molecules and molecules of the co-polymer between the laminating resin and the reaction product and thence to the substantially pure alkyd resin-diisocyanate reaction products of the core 16. The nature of these diffusion zones, as we believe them to be constituted, is illustrated in Figure 11 which diagrammatically represents on a large scale a small area of a skin 14 and adjacent portion of the core 16 in cross section. In Figure 11, as indicated by the legends, the material of the core 16, that is the reaction products of alkyd resin-diisocyanate mixture are represented by the circles 25, the laminating resin molecules are represented by the circles 26 enclosing the crosses, while the co-polymer between the laminating resin and the isocyanate containing molecules are represented by the circles 27 enclosing the diagonal lines. It will be seen from an inspection of Figure 11 that the interfacial area, where the mass of the core 16 joins the innermost skin layer 14, has substantially equal numbers of the three above named molecules 25, 26 and 27, while there is little or no penetration of the substantially pure core material molecules 25 into the skin 14 there are a considerable number of the co-polymer molecules 27 between the innermost skin layer 14 and the adjacent lamination 14. The number of these molecules of the co-polymer gradually lessen in the succeeding laminations 14 until there may be none in the outermost skin lamination. The diffusion area or zones of graduated or merging physical composition and physical characteristics assure great strength in the laminated or sandwich-type product resulting in a product much superior to the typical laminated structures where there are distinct planes or limited sectional areas of abrupt change from one material to the other.

The laminating resins capable of copolymerizing with the reaction products of the alkyd resin and diisocyanate of the core 16 may be selected from substantially different classes of resins or compounds including:

(a) Unsaturated polyesters containing more than one vinyl group per molecule so as to be capable of cross linking and forming insoluble thermosetting type resins. Included in this classification are the reaction products of maleic anhydride with a glycol such as di-ethylene glycol which, after the initial reaction are further heated, and condensed to yield the linear polyester:

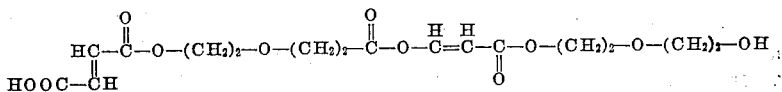

(b) Unsaturated alkyl esters of aryl phosphonic acids such as disclosed in United States Letters Patent No. 2,425,765 issued August 19, 1947. Included in this group are the following:

(1) Diallyl phenyl phosphonate

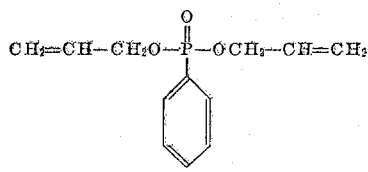

(2) Bis(methallyl) benzene phosphonate

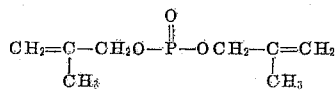

(3) Diallyl toluene phosphonate

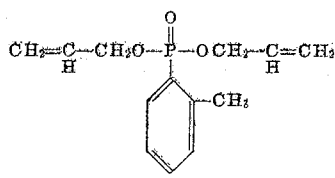

(c) Unsaturated alkyl esters of alkenyl phosphonic acids of the general class disclosed in the United States Letters Patent No. 2,425,766 issued August 19, 1947:

(1) Diallyl isobutene phosphonate

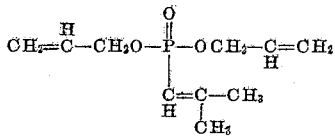

(2) Diallyl styrene phosphonate

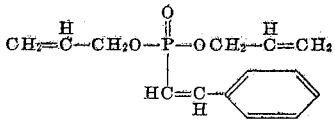

(3) Bis(methallyl) styrene phosphonate

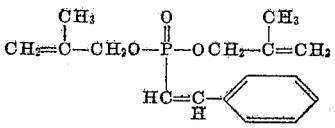

(d) Diallyl phthalate

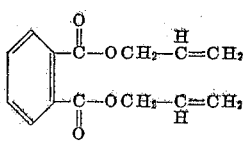

(e) Allyl, methallyl or crotyl glycol carbonates, such as bis(allyl) diethylene glycol carbonate:

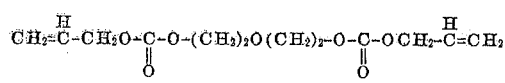

(f) Glycol diacrylate

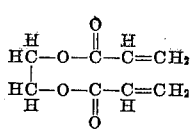

If desired, the laminating resin may comprise a blend or mixture of a selected unsaturated polyester, such as above named, and a monomeric compound which serves as a copolymerizing additive. For example, the unsaturated polyester between diethylene glycol and maleic anhydride with the polymerization carried to an acid number of from 10 to 40 may be mixed with any of the following thermoplastic monomeric vinyl compounds, each having one vinyl group per molecule to constitute the laminating resin.

(a) Styrene (vinyl benzene)

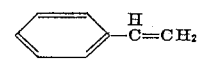

(b) Dichloro styrene

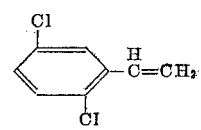

(c) Acrylonitrile (vinyl cyanide)

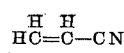

(d) Vinyl acetate

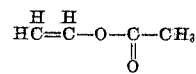

(e) Vinylidene chloride

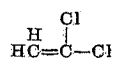

(f) Vinyl chloride

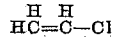

(g) Diphenyl ethylene

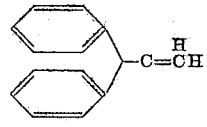

(h) Methyl vinyl ketone

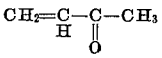

(i) Methyl methacrylate

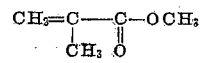

(j) Vinyl esters, such as ethyl vinyl ether

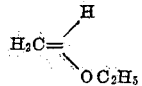

Where the laminating resin for the skin material 14 is a mixture of the unsaturated polyester and the monomeric mono-vinyl compound, there may be from 10 to 100 parts by weight of the monomeric compound for each 100 parts by weight of the unsaturated polyester resin.

The present invention, as illustrated in Figures 6 to 11 inclusive, being directed to the method of making laminated products is not directly concerned with the theory of the chemical action or mechanism attending the copolymerizing of the isocyanate containing molecules of the foaming core material 15 with the laminating resin. However, it appears that there are two ways in which this copolymerization takes place:

(1) By the reaction of the isocyanate containing molecules of the material comprising the core 16 with the hydroxyl (OH) and/or with the carboxyl (COOH) groups of the laminated resin. Thus:

(a)

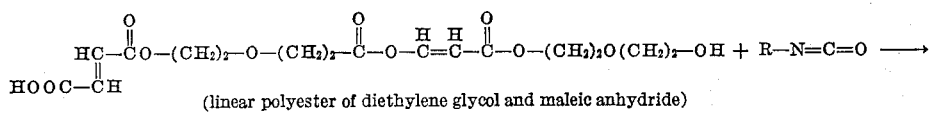

(linear polyester of diethylene glycol and maleic anhydride)

where R=structure attached to an isocyonate group

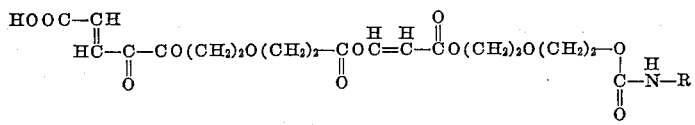

(additional reaction with terminal (OH) group resulting in formulation of a urethane)

(b)

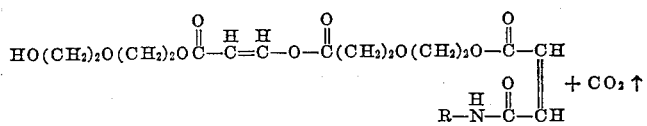

(reaction with terminal (COOH) group resulting in amide structure and liberating carbon dioxide)

(2) By the addition copolymerization of the activated isocyanate groups of the core material 15 with the activated vinyl groups of the laminating resin. Thus:

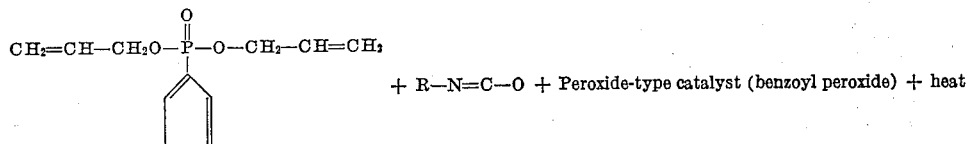

diallyl phenyl phosphonate

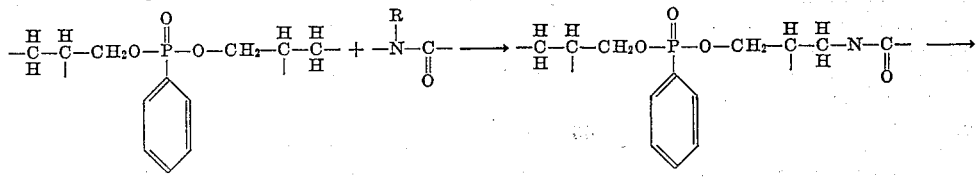

It is to be understood that in the invention as practiced in Figures 6 to 11 inclusive, the laminating resin on, or incorporated in, the skin material 14 is unpolymerized and in a liquid or semi-liquid state when the reactant core producing material or mixture 15 is introduced into the mold cavity and allowed to react. The reaction of the material 15 is accompanied by the development of gas pressure which urges the skin materials 14 outwardly into conforming engagement with the walls of the mold and which brings the reactant foaming isocyanate containing mixture 15 into direct and intimate contact with the laminating resin so as to admix therewith. This admixing of the foaming isocyanate containing mixture 15 with the laminating resin is important in that it not only brings about the above described copolymerization of the two materials but also because it reduces the friction between the rising foaming mixture 15 and the skins 14. When the foaming core material 15 rises along the surface of a dry precured laminated skin the marginal cells of the core 16 are found to be elongated in the vertical direction due to the friction or resistance to vertical motion offered by the pre-cured skin. The resultant elongated cells of the core 16 are somewhat weaker than the uniform and substantially spherical cells of the internal areas of the core 16, leaving a weak interfacial zone. However, when the skin laminating resin is uncured at the time the core material 15 is reacted in the mold, this elongation of the outermost cells of the core 16 is eliminated or at least reduced and because the above described interfacial zone contains the co-polymer of the core material and the laminating resin, the interfacial zone is materially strengthened instead of being weakened.

The reaction of the alkyd resin-isocyanate mixture 15 is also accompanied by heat and this exothermic heat cures or polymerizes the laminating resin. Thus the laminating resin is polymerized and initially cured simultaneously with the core 16, making for a more uniform and stronger product. As in the previously described form of the invention the mold 20—22 may be maintained at a temperature of about 120° F. during the foaming reaction.

Following the pouring and reacting of the core 16 the product is preferably given a post-cure at from 125° F. to 225° F. for from 10 to 20 hours. The finished product may be machined as required and it is usually preferred to cut or trim off the uneven upper portion where the core material has spilled over the top of the mold.

Laminated products or articles such as manufactured in accordance with the methods herein described form the subject of our copending application Serial Number 188,384 filed October 4, 1950.

It should be understood that the invention is not based upon or dependent upon the theories which we have expressed. Nor is the invention to be regarded as limited to the express procedure or materials set forth, these details being given only by way of illustration and to aid in clarifying the invention. We do not regard such specific details as essential to the invention except insofar as they are expressed by way of limitation in the following claims in which it is our intention to claim all novelty inherent in the invention as broadly as is permissible in view of the prior art.

We claim:

1. The method of making a laminated article comprising providing laminating material carrying a wet polymerizable unsaturated organic substance containing at least two groups per molecule as the reactive constituents, said groups being selected from the class consisting of vinyl groups and allyl groups, said substance being capable of copolymerizing with isocyanate molecules, and then bonding a cellular plastic layer with said material by contacting a reactant cellular plastic isocyanate-containing mixture with the wet organic substance-carrying material, and then allowing the mixture to react to form the cellular plastic layer and to copolymerize with said organic substance of said laminating material.

2. The method of making a laminated article comprising impregnating skin material with a wet polymerizable unsaturated organic material containing at least two groups per molecule as the reactive constituents, said groups being selected from the class consisting of vinyl groups and allyl groups, said material being capable of copolymerizing with isocyanate-containing compounds, supporting the impregnated skin material, and then providing a layer of cellular plastic material bonded to the skin material by contacting the wet impregnated skin material with a reactant isocyanate-containing resin mixture, and allowing said mixture to react to form a cellular plastic body while said polymerizable material and mixture copolymerize to constitute a diffusion zone between said skin and body containing molecules of said polymerizable material and said mixture.

3. The method of making a laminated article comprising impregnating fabric skin laminations with a wet polymerizable unsaturated organic material containing at least two groups per molecule as the reactive constituents, said groups being selected from the class consisting of vinyl groups and allyl groups, said material being capable of copolymerizing with isocyanate-containing compounds, arranging the skin laminations in spaced apart relation and then providing a cellular plastic layer between the skin laminations and at the same time curing said polymerizable material by introducing into the space between the skin laminations a reactant isocyanate-containing resin mixture while said resin remains wet, and then allowing the mixture to react to form the cellular layer, to copolymerize with said material in a diffusion zone between said layer and the skin laminations, and to cure said in the laminations.

4. The method of making a laminated article comprising impregnating skin laminations with a wet polymerizable unsaturated organic material containing at least two groups per molecule as the reactive constituents, said groups being selected from the class consisting of vinyl groups and allyl groups, said material being capable of copolymerizing with isocyanate-containing compounds, arranging the skin laminations in spaced apart relation by placing them on the walls of a mold, and then forming a cellular plastic layer between and bonded with the skin laminations by introducing into the space between the skin laminations a reactant isocyanate-containing resinous mixture while said polymerizable material remains wet, and allowing the mixture to react to form a cellular plastic layer, to copolymerize with said material in the interfacial zones of the layer and laminations, and to cure said material in the laminations.

5. The method of making a laminated article comprising impregnating fabric skin laminations with a wet polymerizable material comprising an unsaturated polyester which is the reaction product of a dihydric alcohol and an alpha unsaturated, alpha-beta dicarboxylic acid; and a monomeric compatible co-reactive compound containing groups selected from the class consisting of vinyl groups and allyl groups, said polymerizable material being capable of copolymerizing with isocyanate-containing compounds, arranging the wet skin laminations in spaced apart relation by engaging them on the walls of a mold, and then forming a cellular plastic core between and bonded with said laminations while simultaneously curing said polymerizable material by introducing a reactant alkyl resin-diisocyanate mixture into the space between said laminations while said polymerizable material remains wet, and then allowing the mixture to react to form the core, to copolymerize with said polymerizable material at the interfaces between the core and laminations, and to cure the polymerizable material in the laminations.

6. The method of making a laminated article comprising impregnating inorganic fabric skin laminations with a wet polymerizable material comprising an unsaturated polyester which is the reaction product of a dihydric alcohol and an alpha unsaturated, alpha-beta dicarboxylic acid; and a monomeric compatible co-reactive compound containing groups selected from the class consisting of vinyl groups and allyl groups, said polymerizable material being capable of copolymerizing with isocyanate-containing compounds, arranging the skin laminations in spaced apart relation by engaging them on the walls of a mold, forming a cellular plastic core between and bonded with said laminations while simultaneously curing said polymerizable material by introducing a reactant alkyd resin-diisocyanate mixture into the space between said laminations while said polymerizable material remains wet, allowing the mixture to react to form the core, to copolymerize with said said polymerizable material at the interfaces between the core and laminations, and to cure said polymerizable material in the laminations, and then post-curing the article at from 125° F. to 225° F. for from 10 to 20 hours.

7. The method of making a laminated article which comprises providing a porous fabric skin, impregnating the skin with a liquid polymerizable material comprising an unsaturated polyester which is the reaction product of a dihydric alcohol and an alpha unsaturated alpha-beta dicarboxylic acid, and a monomeric-compatible co-reactive compound containing groups selected from the class consisting of vinyl groups and allyl groups, and then bonding a body of cellular plastic with the skin by contacting a mass of a reactant isocyanate-containing resinous mixture with the skin while said polymerizable material remains wet, and allowing said mixture to react to form the cellular plastic body, to copolymerize with said polymerizable material in the interfacial zone between said skin and body and to cure the polymerizable material in the skin.

8. The method of making a laminated article which comprises providing a porous-material skin, impregnating the material of the skin with a liquid unsaturated polyester containing two or more vinyl groups per molecule, and then bonding a body of cellular plastic with the skin by contacting a mass of a reactant isocyanate-containing resin mixture with the skin while said unsaturated polyester remains in the liquid state, and then allowing said reactant mixture to react to form the cellular body, to copolymerize with said unsaturated polyester in the interfacial region between the skin and said body and to cure the polyester in the skin.

ELI SIMON.
FRANK W. THOMAS.
EDWARD H. BURKART.

References Cited in the file of this patent

UNITED STATES PATENTS

| Number | Name | Date |
| --- | --- | --- |
| 1,484,731 | Malm | Feb. 26, 1924 |
| 1,536,288 | Freedlander | May 5, 1925 |
| 1,610,286 | Hood et al. | Dec. 14, 1926 |
| 1,645,248 | Lower | Oct. 11, 1927 |
| 2,247,337 | Raflovich | June 24, 1941 |
| 2,317,047 | Foote | Apr. 20, 1943 |
| 2,358,369 | Weaver | Sept. 19, 1944 |
| 2,394,122 | Urnston | Feb. 5, 1946 |
| 2,394,327 | Niessen | Feb. 5, 1946 |
| 2,398,388 | Norton | Apr. 16, 1946 |
| 2,430,479 | Pratt | Nov. 11, 1947 |
| 2,456,093 | Swedlow | Dec. 14, 1948 |

FOREIGN PATENTS

| Number | Country | Date |
| --- | --- | --- |
| 392,952 | Great Britain | May 22, 1932 |